United States Patent [19]
Atkin

[11] Patent Number: 4,496,331
[45] Date of Patent: Jan. 29, 1985

[54] FLEXIBLE COUPLINGS

[75] Inventor: Howard S. Atkin, Sutton Coldfield, England

[73] Assignee: Dunlop Limited, London, England

[21] Appl. No.: 342,414

[22] Filed: Jan. 25, 1982

[30] Foreign Application Priority Data

Feb. 13, 1981 [GB] United Kingdom ............... 8104573
Apr. 2, 1981 [GB] United Kingdom ............... 8110411

[51] Int. Cl.³ .............................................. F16D 3/28
[52] U.S. Cl. ..................................... 464/70; 464/106; 464/147
[58] Field of Search ............... 464/112, 125, 128, 132, 464/130, 136, 70, 905, 81, 147, 106

[56] References Cited

U.S. PATENT DOCUMENTS

| | | | |
|---|---|---|---|
| 1,443,969 | 2/1923 | Thiemer | 464/132 X |
| 1,855,640 | 4/1932 | Lord | 464/70 |
| 1,885,646 | 11/1932 | Warner | 464/136 X |
| 2,777,306 | 1/1957 | Wildhaber | 464/112 X |
| 2,917,123 | 12/1959 | Ainsworth | 464/70 X |
| 2,975,621 | 3/1961 | Moulton et al. | 464/132 X |
| 3,481,159 | 12/1969 | Kayser | 464/70 |
| 3,517,528 | 6/1970 | Eccher | 464/125 X |
| 4,103,512 | 8/1978 | McElwain et al. | 464/130 X |
| 4,121,437 | 10/1978 | Michel | 464/70 |

FOREIGN PATENT DOCUMENTS

| | | | |
|---|---|---|---|
| 901739 | 1/1954 | Fed. Rep. of Germany | 464/147 |
| 1363729 | 5/1964 | France | 464/170 |
| 762305 | 11/1956 | United Kingdom . | |
| 798077 | 7/1958 | United Kingdom . | |
| 808807 | 2/1959 | United Kingdom . | |
| 872877 | 7/1961 | United Kingdom . | |
| 959587 | 6/1964 | United Kingdom . | |
| 1048584 | 11/1966 | United Kingdom . | |
| 1388561 | 12/1968 | United Kingdom | 464/130 |
| 1201895 | 8/1970 | United Kingdom . | |

Primary Examiner—Stuart S. Levy
Assistant Examiner—Daniel P. Stodola
Attorney, Agent, or Firm—Stevens, Davis, Miller & Mosher

[57] ABSTRACT

A flexible coupling for connecting two rotatable components, for example driving and driven shafts, to transmit torque from one of the components to the other and also to accommodate relative axial movement between the components comprises at least one torque transmitting element having a pair of integral limbs each connected to a respective one of the components via a bearing. The limbs extend in a generally radial direction relative to the axis of rotation of the coupling so as to be fixed relative to one another in a circumferential direction for transmitting torque but allow rotation of each limb about the axis of the other limb to accommodate axial movement between the components.

18 Claims, 5 Drawing Figures

FLEXIBLE COUPLINGS

This invention concerns improvements in or relating to flexible couplings for connecting two rotatable components, for example driving and driven shafts.

Flexible couplings are known, for example, from U.K. Pat. No. 808,807 comprising a spider having four mutually perpendicular limbs, a rubber bush bonded to each limb, a shell surrounding each bush and means for securing opposite shells to yokes carried by the shafts to be connected.

Although such known arrangements of bushes have excellent torque transmitting capability they are unable to accommodate relative axial movement between the shafts i.e. in the direction of the length thereof. In order to accommodate relative axial movement the couplings generally make use of a splined connection between the yokes and associated shafts such that the yokes rotate with but are slidable relative to the associated shafts. This requires a relatively long connecting portion on the yokes which greatly increases the weight and cost of the coupling.

According to the present invention a flexible coupling for connecting two rotatable components comprises at least one torque transmitting element consisting of two integral limbs angled relative to one another, a respective bearing means mounted on each limb and respective means for connecting each bearing means to a respective one of the rotatable components such that in use each limb extends in a generally radial direction with respect to the axis of the rotation of the coupling.

In use the torque transmitting element of the coupling in accordance with the present invention is operable not only to transmit torque from one of said rotatable components to the other of said components but also to accommodate relative axial movement therebetween thus avoiding the need to provide means separate from and in addition to the torque transmitting element such as the afore-mentioned splined yoke/shaft connection of the prior art couplings, for accommodating relative axial movement between the rotatable components.

More particularly the integral limbs of said element are fixed relative to one another in the circumferential direction with respect to said rotational axis for transmitting torque between said components but each limb is able to rotate about the axis of the other limb to accommodate axial movement between said components.

Each bearing means may comprise a resilient bush mounted on the associated limb, for example a rubber bush bonded to the limb, usually at the free end thereof. Alternatively each bearing means may comprise a bearing mounted on the associated limb, for example a plain bearing, spherical bearing, roller bearing, needle bearing or similar, usually at the free end thereof.

More preferably each bearing means comprises the combination of a resilient bush and a bearing as above described. The resilient bush primarily damps vibration and allows relative axial movement between the components to be accommodated by deformation thereof and the bearing enables the coupling to accommodate large running angles between the components to be connected.

Preferably the bearing is rotatably mounted on the associated limb of the torque transmitting element and the resilient bush is mounted on the bearing and surrounded by an outer casing adapted for connection to a respective one of the rotatable components.

Preferably the resilient bush, made for example from rubber, is pre-loaded in the radial direction i.e. under compression. Pre-loading may be effected during manufacture of the torque transmitting element by appropriate selection of the dimensions of the limb, associated bush and casing or on assembly of the coupling, for example the casing may consist of a shell split longitudinally into two halves each bonded to the bush with the halves being subsequently pressed and joined together.

Preferably the point of intersection of the respective axes of the limbs lies on the axis of rotation of the coupling. Preferably the limbs subtend an angle of approximately 90° or less relative to one another.

Preferably each bearing means is connected to a respective one of the rotatable components by an associated yoke.

Preferably means is provided to protect each bearing means from contaminants e.g. oil. Such means may comprise a cover, e.g. formed from oil resistant material such as nylon, attached to each casing or a member arranged to deflect oil away from the coupling. Alternatively such means may comprise a coating of material, preferably oil resistant, such as nylon or hypalon, applied to exposed parts of the bearing means.

In a preferred construction the coupling comprises two of said torque transmitting elements. Preferably the limbs of both elements lie in a common plane transverse to the axis of rotation of the coupling and the limbs are uniformly spaced in a circumferential direction i.e. mutually perpendicular.

The invention will now be described in more detail, by way of example only, with reference to the accompanying drawings wherein.

Figure 1:
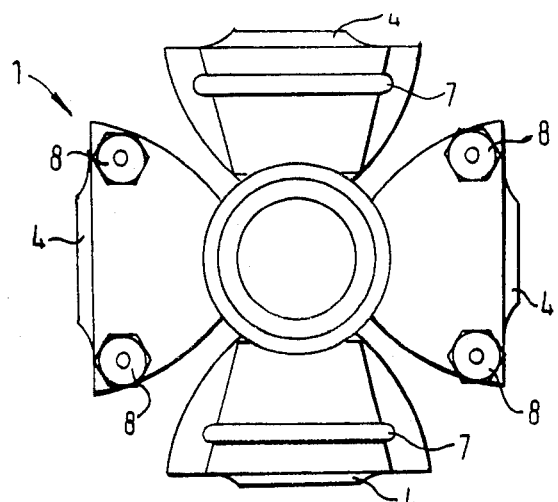
FIG. 1 is an end view of a first embodiment of a coupling in accordance with the present invention.
Figure 2:
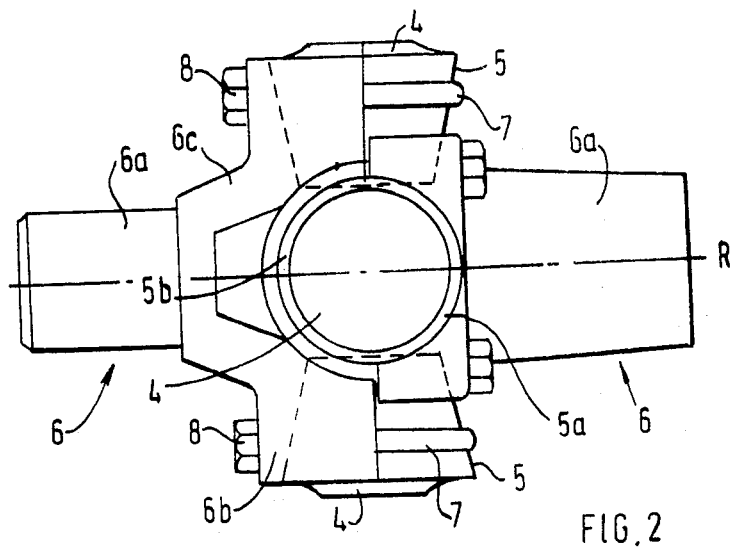
FIG. 2 is a side view of the coupling shown in FIG. 1.
Figure 3:
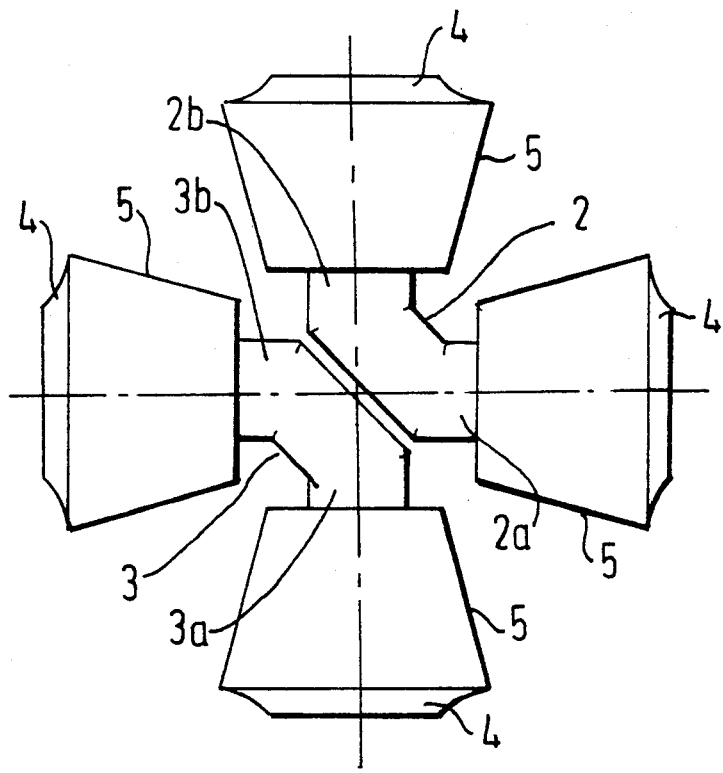
FIG. 3 is a view, along the axis of rotation of the coupling, of the torque transmitting elements of the coupling shown in FIGS. 1 and 2.

The coupling 1 shown in FIGS. 1 to 3 of the accompanying drawings comprises two similar torque transmitting elements 2 and 3 each consisting of two integral limbs 2a,2b and 3a,3b respectively extending normal to one another. The elements 2,3 are disposed with the limbs 2a,2b, 3a and 3b thereof mutually perpendicular to one another and lying in a common plane transverse to the axis of rotation R of the coupling. The point of intersection of the respective axes of the limbs 2a,2b, 3a and 3b coincides with the axis of rotation R of the coupling. A respective resilient rubber bush 4 is bonded to the radially outer end of each limb 2a, 2b 3a and 3b. Each bush is frusto-conical with the apex thereof directed radially inwards. The bore of each bush is also frusto-conical, the angle of taper being less than that of the external surface, and the associated limb is correspondingly tapered. A respective frusto-conical metal casing 5 surrounds and is bonded to each of the bushes 4. Each casing 5 is split longitudinally to form two shell halves 5a,5b which are pressed together on assembly to pre-load the bushes in compression. A respective yoke 6 connects the casings 5 of opposite bushes 4 to a respective one of two rotatable components (not shown) for example driving and driven shafts. Each yoke has a short stub axle 6a for connection to the associated rotatable component and two forked arms 6b,6c each of which receives and locates one half shell of each associated casing. A respective U-bolt 7 surrounds the other half shell and the free ends thereof pass through respective holes in the ends of the forks and are secured thereto by nuts 8. When the nuts 8 are tightened the shell halves 5a,5b are brought together and the associated bush 4 is radially compressed.

As above-described each torque transmitting element 2,3 is connected to both rotatable components. The limbs of each element extend radially with respect to the axis of rotation of the coupling whereby each element is substantially rigid when loaded in the circumferential direction for transmitting torque between the components. In addition when loaded in the axial direction one limb of each element is able to rotate about the axis of the limb integral therewith by deformation of the bush bonded to the latter limb for accommodating axial movement between the components.

Figure 4:
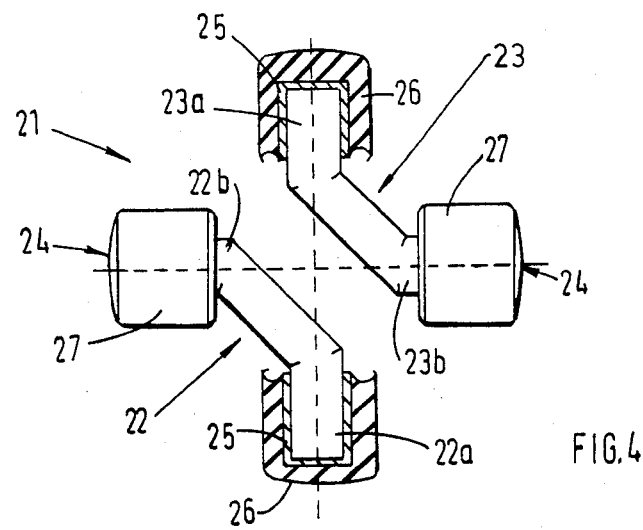
FIG. 4 is a view along the axis of rotation of a second embodiment of a coupling according to the present invention showing the torque transmitting elements.
Figure 5:
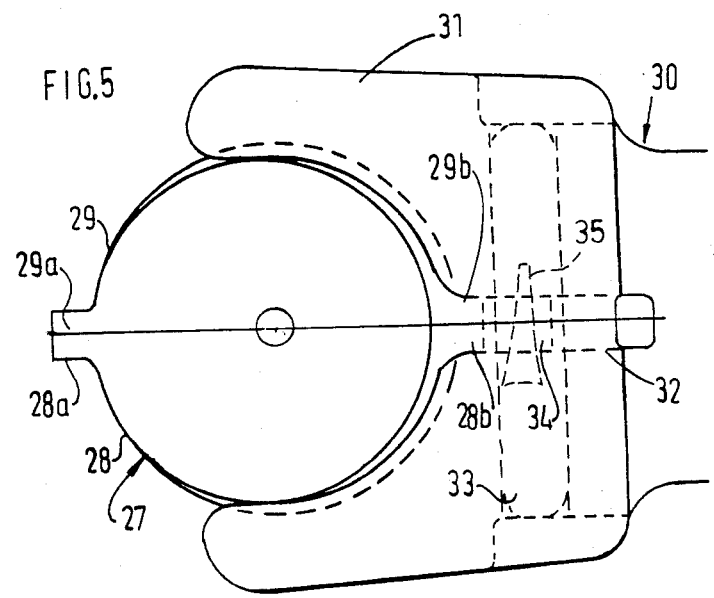
FIG. 5 shows the method of mounting the coupling shown in FIG. 4.

A second embodiment of a coupling according to the present invention is shown in FIGS. 4 and 5 wherein the coupling 21 comprises two similar torque transmitting elements 22,23 each comprising a pair of integral limbs 22a,22b and 23a,23b respectively extending normal to one another. The elements 22,23 are disposed with the limbs 22a,22b, 23a and 23b thereof mutually perpendicular to one another and lying in a common plane transverse to the axis of rotation of the coupling. The point of intersection of the respective axes of the limbs 22a, 22b, 23a,23b coincides with the axis of rotation of the coupling.

A respective bearing means 24 is mounted on the radially outer end of each limb 22a,22b, 23a and 23b. Each bearing means 24 comprises an inner, cup-shaped nylon bush 25 mounted on and rotatable relative to the associated limb and an outer, cup-shaped resilient rubber bush 26 mounted on and bonded to the bush 25. A respective split metal casing 27 surrounds and is bonded to each bush 26. Each casing is split longitudinally to form two similar halves 28,29 each having a narrow flange 28a,29a along one longitudinal edge and a wider flange 28b,29b along the other longitudinal edge. The narrow flanges 28a,29a are joined e.g. by spot welding and the bush 25 moulded in situ with the wider flanges 28b,29b spaced apart a small predetermined distance. As described in more detail below the wider flanges 28b,29b are subsequently pressed together on assembly to pre-load the resilient bushes in compression.

On assembly opposed limbs 22a,23a and 22b,23b are secured to a respective one of two rotatable components (not shown) by a respective yoke 30, i.e. each element 22,23 is connected to both components. More particularly each yoke 30 has two forked arms 31 (one only shown in FIG. 5) to each of which a respective one of two opposed bearing means is secured. Each forked arm 31 defines a recess in which the casing 27 of the associated bearing means is received with the wider flanges 28b,29b of the casing halves locating in an elongate aperture 32 in the bight portion of the arm 31, the dimensions of the aperture 32 being such that the flanges 28b,29b are pressed together thereby pre-loading the resilient bush in compression. A locking pin (35) inserted into a transverse slot 33 in each arm 31 passes through a complementary opening 34 defined by the flanges 28b,29b and serves to secure and retain the bearing means in the recess. The opening 34 and slot 33 are slightly misaligned on initial location of the bearing means and the locking pin has an initial tapered section such that on passing through the opening 34 the latter is brought into alignment with the slot 33 thereby drawing the bearing means further into the recess. It will be apparent from the foregoing that pre-loading of the resilient bush is determined by the spacing of the wider flanges 28b,29b on moulding the bearing meas, the subsequent pressing together of the flanges being effected in a predetermined controlled manner by the dimensions of the aperture 32. In this way the degree of pre-loading is accurately controlled. In addition the outer surface of each casing 27 and the associated forked arm 31 are conveniently profiled to define complementary interengaging formations (not shown) which serve to positively locate the casing in the recess and prevent displacement of the casing relative to the forked arm in the radial direction.

Each element 22,23 is substantially rigid when loaded in the circumferential direction for transmitting torque between the components, the rubber bushes 26 providing limited resilience to damp vibrations. When loaded in the axial direction one limb of each element is able to rotate about the axis of the other limb integral therewith to accommodate axial movement between the components. This rotation is facilitated not only by deformation of the resilient bushes 26 but also by the bearing 25 associated with said other limb which is freely rotatable thereon.

A further advantage of the bearing means comprising the combination of resilient bush and bearing is that inclination of one component relative to the other component is accommodated by rotation of the bearing part of the bearing means thus enabling larger running angles to be accommodated than is possible when the bearing means comprise a resilient bush only.

The invention is not restricted to the abovedescribed embodiments which may be modified in a number of ways. For example a coupling may comprise one or three or more of the above-described torque transmitting elements. Each casing and associated resilient bush may be frusto-conical, cyindrical or spherical. Each casing may comprise a one-piece shell with the resilient bush being compressed in the radial direction during manufacture. The exposed surfaces of each resilient bush may be coated with an oil-resistant material, e.g. nylon or hypalon, or a cover may be attached to each casing to protect the bearing means from oil contamination.

Each of the resilient bushes of the coupling shown in FIGS. 1 to 3 may be replaced by a bearing, for example a respective rigid nylon bush rotatably mounted on each limb of the torque transmitting elements.

Having now described my invention what I claim is:
1. A flexible coupling for connecting two rotatable components lying along an axis of rotation comprising:
   a driven component and a driving component with a torque transmitting means radially disposed between said components;
   said torque transmitting means comprising at least two separate elements, each element having a central portion in a common plane generally transverse to said axis of rotation, each element further having inclined limbs depending from said central portions, said inclined limbs lying along radius lines and in said transverse plane, one limb of each element being connected to the driving component and the other limb of each element being connected to the driven component and the driving and driven components respectively being connected by the limbs of each element at substantially diametrically opposed points;

bearing means on each inclined limb, said bearing means permitting rotation of a respective limb about an axis inclined relative to the normal axis of rotation of the coupling; means connecting said bearing means to said driving and driven components so as to permit axial movement between said components by the limb of one element rotating about the axis of the other limb of that element.

2. A coupling according to claim 1 wherein said limbs subtend an angle of 90° or less relative to one another.

3. A coupling according to claim 1 wherein the point of intersection of the respective axes of said limbs lies on the axis of rotation of the coupling.

4. A coupling according to claim 1 in which said at least two torque transmitting elements of a similar type are disposed with the limbs thereof uniformly spaced in a circumferential direction.

5. A coupling according to claim 4 wherein said limbs lie in a common plane transverse to the axis of rotation of the coupling in the unloaded condition.

6. A coupling according to claim 4 wherein alternate bearing means are connected to a respective one of the rotatable components.

7. A coupling according to claim 1 wherein each bearing means comprises a resilient bush.

8. A coupling according to claim 1 wherein each bearing means comprises the combination of a resilient bush and a bearing.

9. A coupling according to claim 8 wherein said bearing is rotatably mounted on the associated limb and said resilient bush mounted on said bearing.

10. A coupling according to claim 7 or claim 9 wherein each resilient bush is surrounded by a rigid casing.

11. A coupling according to claim 10 wherein each resilient bush is pre-loaded in compression.

12. A coupling according to claim 11 wherein each casing consists of a shell split longitudinally into two shell halves each bonded to said bush and said pre-loading is effected by pressing said shell halves together.

13. A coupling according to claim 10 wherein each casing is connected to a respective one of said rotatable components by an associated yoke.

14. A coupling according to claim 13 wherein each casing is received in a recess defined by a pair of yoke arms.

15. A coupling according to claim 14 wherein each casing is attached to the associated yoke arms by a U-bolt.

16. A coupling according to claim 14 wherein each casing is attached to the associated yoke arms by a locking pin received in corresponding apertures in said casing and yoke arms.

17. A coupling according to claim 1 including respective cover means for each bearing means.

18. A flexible coupling for connecting two rotatable components lying along an axis of rotation comprising:

a driven component and a driving component with a torque transmitting means radially disposed between said components;

said torque transmitting means comprising at least two separate elements, each element having a straight central portion lying generally parallel to a straight central portion of the other element in a plane generally transverse to said axis of rotation, each element further having inclined limbs at each end of said straight central portions, said inclined limbs lying along radius lines and in said transverse plane, one limb of each element being connected to the driving component and the other limb of each element being connected to the driven component, and the driving and driven components, respectively, being connected by the limbs of each element at substantially diametrically opposed points;

bearing means on each end of each inclined limb, said bearing means permitting rotation of a respective limb about an axis inclined relative to the normal axis of rotation of the coupling; means connecting said bearing means to said driving and driven components so as to permit axial movement between said components by the limb of one element rotating about the axis of the other limb of that element.

* * * * *